G. W. LESTER.
LOCK NUT.
APPLICATION FILED JULY 14, 1920.
1,406,043.
Patented Feb. 7, 1922.
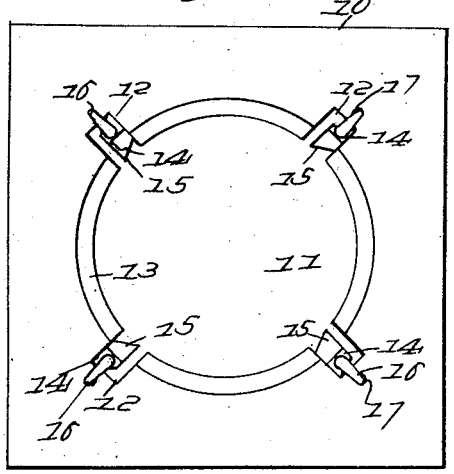
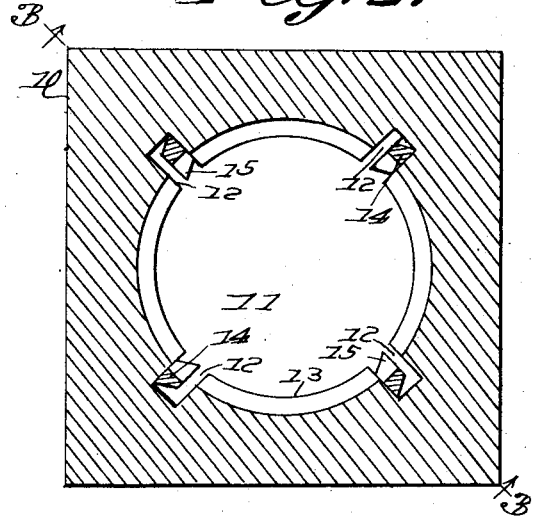
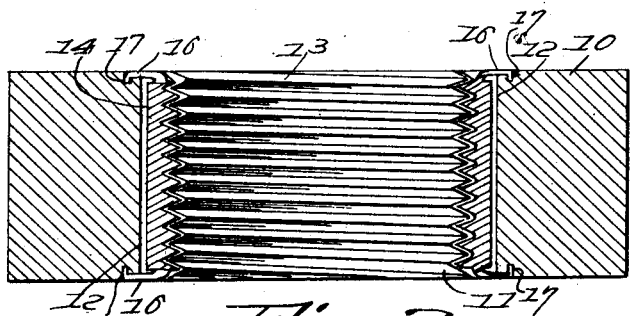
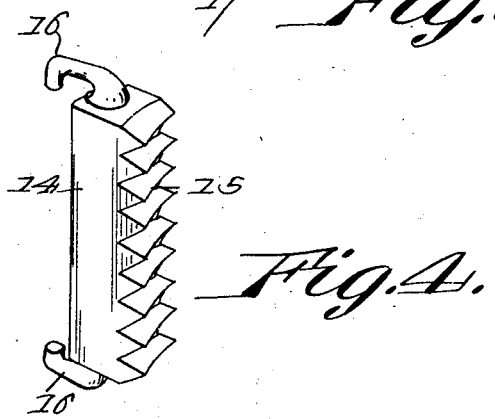
Inventor
G. W. Lester,
By G. Hume Talbert, Attorney

UNITED STATES PATENT OFFICE.

GEORGE W. LESTER, OF DALEVIEW, MONTANA.

LOCK NUT.

1,406,043.  Specification of Letters Patent.  Patented Feb. 7, 1922.

Application filed July 14, 1920. Serial No. 396,056.

*To all whom it may concern:*

Be it known that I, GEORGE W. LESTER, a citizen of the United States of America, residing at Daleview, in the county of Sheridan and State of Montana, have invented new and useful Improvements in Lock Nuts, of which the following is a specification.

The object of the invention is to provide a simple and relatively inexpensive lock nut having means readily applicable to a nut of the ordinary construction whereby the same may be secured in adjusted positions upon the bolt engaged thereby to prevent displacement or disarrangement by jarring or vibration, and with this object in view, the invention consists in a construction and combination of parts, of which a preferred embodiment is shown in the accompanying drawings, wherein:—

Figure 1, is a face view of a nut equipped with the locking means constructed in accordance with the invention.

Figure 2, is a sectional view of the same.

Figure 3, is a transverse sectional view on the plane indicated by the line 3—3 of Figure 2.

Figure 4, is a detail view in perspective of one of the locking dogs.

The locking means may be applied to a nut 10 of any preferred construction by providing in the bolt opening or eye 11 thereof one or more radial grooves 12 disposed in intersecting relation with the threads 13 and extending continuously from one side face of the nut to the other as shown clearly in Figure 3. In each of these thread intersecting grooves there is arranged a dog 14 consisting of a bar as indicated in detail in Figure 4, having teeth 15 corresponding and registering with the threads of the nut and adapted to engage with the threads of the bolt upon which the nut is fitted, said dog having terminal pliable ears 16 which are reversely extended into engagement with sockets 17 formed in the side surfaces of the nut serving to pivotally connect the dog to the nut.

The grooves 12 are of a width exceeding the width of the dogs to the end that as the nut is threaded on the bolt, the dog assumes an inclined position in the groove so that the bevelled edges of the teeth 15 contract or slide freely over the surfaces of the threads of the bolt, but obviously when a reverse movement of the nut in relation to the bolt is attempted, the teeth bite into the bolt threads and thus effectively lock the nut against reverse rotation.

The invention having been described, what is claimed as new and useful is:—

A lock nut having its bolt opening provided with a groove disposed in intersecting relation with the threads of the opening, and a dog arranged in said groove and of less width than the latter, the dog being provided with teeth of a pitch corresponding to the pitch of the threads in the bolt opening and having terminal pliable ears at each end which are reversely extended and pivotally engaged in sockets formed in the side surfaces of the nut to one side of the transverse center of the groove.

In testimony whereof I affix my signature.

GEORGE W. LESTER.